3,493,610
PREPARATION OF FORMIC ACID SALTS
Thomas H. Coffield, Orchard Lake, Mich., assignor to Ethyl Corporation, New York, N.Y., a corporation of Virginia
No Drawing. Filed Nov. 28, 1967, Ser. No. 686,279
Int. Cl. C07c *53/04, 53/06*
U.S. Cl. 260—542                                                         7 Claims

ABSTRACT OF THE DISCLOSURE

Alkali metal salts of formic acid are prepared by reacting carbon dioxide, hydrogen and an alkali metal manganese pentacarbonyl such as sodium manganese pentacarbonyl. Preferably the reaction is conducted in the presence of an inert ether solvent. It is also preferred to conduct the process using the gaseous reactants under pressure.

BACKGROUND

Sodium manganese pentacarbonyl has been known for some time; Hieber et al., "Z. Naturforsch." 12*b*, 478–479 (1957). The preparation of alkali metal manganese pentacarbonyls from dimanganese decacarbonyl and an alkali metal is the subject of Coffield, U.S. 2,967,087. The alkali metal manganese pentacarbonyls react with hydrogen ion to form manganese pentacarbonyl hydride; Coffield, U.S. 3,252,753.

A series of organo manganese carbonyl compounds have been prepared from alkali metal manganese pentacarbonyls; Closson et al., U.S. 3,007,953, U.S. 3,029,266, U.S. 3,256,306. Alkali metal manganese pentacarbonyls can be also employed to prepare nitroso manganese tetracarbonyl; Coffield U.S. 3,118,728.

Formic acid salts are known compounds and have the many utilities known for them. For example, they can be used as chemical intermediates. Feiser and Feiser, "Organic Chemistry," second edition, D. C. Heath and Company (1950), pp. 165–6, states that the method of manufacture of formic acid involves the reaction of sodium hydroxide with carbon monoxide to produce sodium formate, and the resulting sodium formate yields free formic acid when treated with sulfuric acid.

SUMMARY OF THE INVENTION

In essence, this invention comprises the discovery that alkali metal formic acid salts can be prepared by reacting an alkali metal manganese pentacarbonyl with hydrogen and carbon dioxide.

DESCRIPTION OF PREFERRED EMBODIMENTS

Of the alkali metal manganese pentacarbonyls which can be employed as starting materials, the lithium, sodium, and potassium compounds are preferred. Sodium manganese pentacarbonyl is most preferred because it is cheaper.

In conducting the process of this invention, best results are obtained if the reaction is carried out using carbon dioxide under pressure. Pressures within the range of 50 to 1000 p.s.i.g. can be employed. Most preferably, pressures from about 50 to about 500 p.s.i.g. are used. Similarly, it is preferred that the hydrogen used in this process be under pressure. Hydrogen pressures within the range of 50 to 1000 p.s.i.g. and, most preferably, from about 400 to about 800 p.s.i.g. are employed. The hydrogen need not be pure. It can be admixed with other gases. For example, the process of this invention can be conducted using synthesis gas as the source of hydrogen. In other words, the reaction can be conducted in the presence of carbon monoxide. When the hydrogen is admixed with carbon monoxide it is preferred that the carbon monoxide pressure be from 50 to 1000 p.s.i.g. and, most preferably, from about 50 to about 500 p.s.i.g.

It will be immediately apparent to a skilled practitioner that there is no real upper limit on the pressures of the gaseous reactants. The values given above afford good results, but there is nothing critical in them.

The alkali metal manganese pentacarbonyl and carbon dioxide react in a mole ratio of 1:1. Likewise, one-half mole of hydrogen gas is consumed for each mole of manganese pentacarbonyl or carbon dioxide reacted. Although the reaction can be carried out using these molar ratios, it is not necessary to do so. In many instances best results are obtained by using an excess of one or two rectaants, say up to 10 moles or more, in order to assist the reaction in going to completion. For this purpose, it is preferred to use an excess of carbon dioxide and/or hydrogen since these materials are less expensive than the alkali metal manganese pentacarbonyl starting material.

The reaction proceeds without a solvent, but best results are obtained if a solvent is employed. Any solvent which is inert under the reaction conditions can be used. Preferred inert solvents are ethers. The ethers may be cyclic or straight chain. Moreover, they may contain one or a plurality of ether linkages. Typical ethers which can be employed are described in U.S. 2,967,087, supra, and in U.S. 3,124,606. Additional ethers which may be employed as solvents are also described in U.S. 3,194,824. The description of the ethers in the aforesaid patents is incorporated by reference herein as if fully set forth. A highly preferred ether is tetrahydrofuran.

In order to achieve an appreciable rate of reaction, the process is best conducted at a temperature within the range of from about 85° to about 275° C. A preferred temperature range is from about 100° to about 250° C.

The reaction time is not critical. Usually times within the range of 1 to 10 hours are sufficient.

The following example serves to illustrate the process of the invention, but does not limit it.

EXAMPLE 1

A solution of $NaMn(CO)_5$ in 30 ml. of tetrahydrofuran was charged into a rocking autoclave and pressured with 400 p.s.i. of carbon dioxide. When agitation was commenced, the pressure dropped rapidly to 290 p.s.i. The autoclave was then pressured with 800 p.s.i. of hydrogen, 800 p.s.i. of carbon monoxide and was heated 3 hours at 200°.

The reaction mixture consisted of a yellow-orange solution and a white solid. The solid was filtered off and identified as sodium formate by infrared examination (1.46 g., 100% yield based on $NaMn(CO)_5$). The filtrate contained $Mn_2(CO)_{10}$ and $HMn(CO)_5$ (infrared evidence). After evaporation of solvent, 2.87 of $Mn_2(CO)_{10}$ (71% yield) was isolated by sublimation.

Similar results are obtained when the reaction is carried out at 150°, 175° and 250° C.

Similar results are obtained when the alkali metal manganese pentacarbonyl employed is lithium manganese pentacarbonyl or potassium manganese pentacarbonyl.

Similar results are obtained when the solvent employed is dioxane, ethyl-butyl ether, diethyleneglycol dimethyl ether, diethyleneglycol and dimethoxyethane.

Similar results are obtained when the hydrogen pressure is within the range of from 400 to 800 p.s.i.g., when the carbon dioxide pressure is from 50 to 500 p.s.i.g. and the carbon monoxide pressure is from 0 to 500 p.s.i.g.

Having fully described the process of this invention, it is desired that the patent protection granted be limited solely by the lawful extent of the appended claims.

I claim:

1. Process for the preparation of an alkali metal salt of formic acid, said process comprising contacting carbon dioxide, an alkali metal manganese pentacarbonyl and hydrogen or a mixture of hydrogen and carbon monoxide, the pressure of carbon monoxide in said mixture being from 50–1000 p.s.i.g.; said process being carried out at a temperature in the range of from about 100° to about 250° C. with or without an inert solvent.

2. Process of claim 1 wherein said pentacarbonyl is sodium pentacarbonylmanganate, $NaMn(CO)_5$.

3. Process of claim 2 being conducted under a carbon dioxide pressure within the range of from about 50 to about 500 p.s.i.g.

4. Process of claim 3 being conducted under a hydrogen pressure of from about 400 to about 800 p.s.i.g.

5. Process of claim 4 being conducted in the presence of a carbon monoxide pressure of from about 50 to about 500 p.s.i.g.

6. Process of claim 5 being conducted in the presence of an inert ether solvent.

7. Process of claim 6 wherein said solvent is tetrahydrofuran.

References Cited

UNITED STATES PATENTS 1,204,933   11/1916   Bredig _____ 260—542

LORRAINE A. WEINBERGER, Primary Examiner

V. GARNER, Assistant Examiner